United States Patent Office 2,717,852
Patented Sept. 13, 1955

2,717,852

METHOD OF MAKING DEXTROSE USING STARCH-GLUCOGENASE

Irwin Stone, New York, N. Y., assignor to Wallerstein Company, Inc., New York, N. Y., a corporation of New York No Drawing. Application August 18, 1949,
Serial No. 111,086

3 Claims. (Cl. 195—17)

This invention relates to novel enzyme preparations and methods of making and using them.

At the present time, many enzymatic reactions are carried out by addition of the soluble enzyme to the substrate and the enzyme remains in the final substrate, slowly continuing its reaction. This produces an unstable product, the characteristics of which progressively change. To eliminate the continuous action beyond a standard reaction point, the activity of the residual enzyme is destroyed by a processing step involving destruction by heat, pH changes, or by other means. Inactivation becomes most uneconomical when high enzyme concentrations are required to accelerate reactions so that they will be completed within short time periods. The wasteful use of the enzyme is obvious, but up to the present no other means have been available.

I have found that enzymes may be adsorbed upon suitable carriers and that in such form they retain their activity and may be employed to effect enzymatic conversions of substrates economically when functioning as a catalytic packing in a tower or in accordance with the principles of a "fluid catalyst." The enzyme-carrier complex will also efficiently function when suspended and stirred in a substrate in accordance with a batch process operation. When so used, the adsorbed enzyme possesses many unexpected and heretofore unknown characteristics and functions, which confirm the novelty of this application, namely: the enzyme adheres to the carrier, the enzyme generally is not eluted by the flow of substrate even over long periods of time, the enzyme does not pass into the effluent to continue the reactions beyond controlled or predetermined limits, a very effective high concentration ratio of enzyme to substrate may be economically utilized, and the initial action of the adsorbed enzyme is retained. In general, the carrier has a saturation point for the adsorbed enzyme and the most efficient and economical optimal operation of these enzyme-carrier complexes is at some level below this saturation value. It is generally found that when working at levels above the optimum saturation point, the excess of the enzyme may be removed by the substrate until the optimum saturation point has been reached.

Heretofore enzyme reactions have been conducted by the batch method with no means to permit carrying out a wholly continuous process. Excess enzymes in the substrate have been unrecoverable or purposely destroyed. My invention embodies new principles which permit designing and operating enzymatic reactions by continuous processes. Furthermore, no excess enzyme is required nor is the useful or excess amount of enzyme dissipated or lost in the substrate.

A further advantage is that the adsorbent carriers either do not adsorb the deleterious or undesirable impurities from the enzyme preparation during the preparation of the enzyme-carrier matrix, or the impurities are adsorbed so tenaciously that they are not released to contaminate the substrate. The substrate is neither contaminated by the enzyme nor by associated impurities. In the direct addition to the substrate in the batch method it is impossible to avoid this contamination of the substrate or end products by the impurities in the enzyme preparation.

Some enzymes at the present time can only be furnished commercially in a liquid form but for certain industrial applications a dry form is to be preferred. Such enzymes may be supplied as a stable, dry or paste-like product when adsorbed on a suitable carrier in accordance with my invention.

The enzyme-carrier complex is a versatile product form having breadth and flexibility in its application methods. The enzyme-carrier complex may be added to a substrate and processed by the batch method. The complex may be left in the substrate or separated by known mechanical means, such as filtration, sifting or jigging, and reused in subsequent batches. In continuous or semi-continuous operations the carrier complex may in part or in whole constitute the catalyst packing of a catalytic tower or chamber. As a solid catalyst the enzyme-carrier complex may effect reactions in a substrate according to the unit process operation known in chemical engineering as "fluid catalyst." If so desired, the enzyme-carrier complex may be employed in a batch process, for example, the complex may be stirred in the substrate under the optimal conditions of concentration, temperature and pH. When the desired degree of reaction has been reached, the enzyme need not be inactivated nor its activity destroyed. The complex may be removed, as by filtration, and reused with full efficiency in subsequent batches.

I have found that enzymes of biological origin, such as fungal, animal and vegetable enzymes, may be adsorbed upon suitable carriers and in such adsorbed-complex form promote and effect chemical reactions without substantial loss of activity or elution by the substrate. The enzymes may be adsorbed from a pure solution or from a solution of a less refined form. In many cases the use of a less pure form will simultaneously eliminate certain purification and concentration steps and permit savings in manufacturing costs. An enzyme also may be adsorbed by one carrier for particular reasons of manufacturing methods and later transferred to a second carrier that possesses a higher adsorption potential.

Because the many existing enzymes vary widely as to their degree of sensitivity to ambient media and the physical conditions of such as well as their individual characteristics and propensities to be adsorbed by various carriers, I have found that general methods are applicable, however, highest efficiencies are attained by considering the optimal conditions and preferred carrier for each specific enzyme. For example, bentonite as a carrier is more difficult to prepare in a dry form than activated carbon, for example, of the type known as Darco G-60. Moreover, the bentonite imparts an increase in the viscosity of an aqueous substrate when the complex is used in the batch method.

Enzymes may be adsorbed upon many types of carriers such as activated carbons, bleaching and decolorizing clays, fuller's earth, activated bauxite, natural and synthetic zeolites, metallic silicates especially the iron, aluminum or magnesium silicates of the bentonite type, silica gel, aluminum hydroxide, activated aluminum oxide, cereal grains, hulls, bran and ion-exchange resins.

Although enzymes may be adsorbed and retained over a wide range of pH values, I have found that the optimal conditions for adsorption and application are related to and are defined by reference to the known activities of the specific enzymes and carriers.

The stability of the enzyme-carrier complex and its resistance to elution is a function of the adsorptive power of the particular carrier in a normal substrate or its reaction products and not in a special eluting solution. It is known that an enzyme may be partially or entirely eluted from carriers by certain solutions and if suitable conditions are employed, some degree of elution will be effected. The surprising fact is that the enzymes generally are not eluted by the normal aqueous or organic substrates they act upon. For example, a fungal enzyme having starch-glucogenase activity and adsorbed upon activated carbon is not eluted from the enzyme-carrier complex by a liquefied aqueous starch solution or the aqueous solution of dextrose resulting therefrom. Water alone, for instance, will not remove a starch-glucogenase enzyme adsorbed on carbon. Such starch-glucogenase enzyme preparations are therefore highly suitable for the production of dextrose from starches and their conversion products.

The starch-glucogenase activity of an enzyme preparation may be expressed conveniently in terms of the unimolecular reaction constant "$k$" which represents the initial reaction velocity of the formation of dextrose. When tested under prescribed conditions, it has been found that the course of the formation of dextrose from Lintner starch as a result of the starch-glucogenase activity of the enzyme preparation follows the unimolecular reaction law as expressed by the equation:

$$k = \frac{1}{t} \log 10 \frac{a}{a-x}$$

wherein $k$ is the unimolecular reaction constant, $t$ is the time, $a$ is the initial and $a-x$ is the concentration of the starch at time "$t$."

For starch-glucogenase activity, the value of $k$ has been found to be substantially proportional to enzyme activity when tested under conditions such that about 50% hydrolysis is effected on a 1% Lintner starch solution at a pH value of 5.0 and a temperature of 40° C. in 30 minutes. For the determination, 5 ml. of a "test" solution of the enzyme preparation is added to a solution containing 25 ml. of water and 10 ml. of a 1% Lintner starch solution buffered at pH 5.0 and the hydrolysis is allowed to proceed for exactly 30 minutes at 40° C. 2 ml. of a 5% sodium carbonate solution is then added to stop hydrolysis and the volume is made up to 50 ml. with water. The quantity of dextrose formed by the action of the enzyme on the starch is determined colorimetrically by the Tauber and Kleiner method as modified by Gray and Rothchild, Ind. and Eng. Chem., Anal. Ed., 13:902 (1941). The value of $k$ for the enzyme "test" solution is defined as calculated from the data thus obtained by the equation:

$$k \text{ (of "test" solution)} = \frac{1}{30} \log \frac{100}{100-x}$$

wherein $x$ is the per cent hydrolysis calculated from the amount of dextrose formed. A "$k$" value, based on 100 grams of the enzyme preparation, is calculated by the equation:

"$k$" (per 100 gm. enzyme preparation) =

$$\frac{k \text{ (of "test" solution)} \times 100}{\text{concentration of enzyme preparation in "test" solution (in grams per 100 ml.)}}$$

The "$k$" value as thus determined and calculated will be used in the specification and claims to designate the starch-glucogenase activity of an enzyme preparation.

In one method for preparing an efficient enzyme catalytic tower an enzyme preparation, such as a fungal diastatic enzyme, is added to cold water held at 0° to 5° C. A carrier, such as activated carbon, is slowly added during mild agitation. In about 10 minutes the water is substantially void of any enzyme activity. The enzyme-carrier complex is then removed as by filtration and transferred to a column or tower to become the central strata of packing between a top and a bottom layer of activated carbon. Each of these layers may be approximately one-quarter the depth of the enzyme carbon complex and serve to protect the catalyst mass.

The column packing may be varied with respect to the depth of protective layers employed. A carrier different from that used for preparing the specific enzyme carrier complex may be employed. In some cases, especially when the enzyme-carrier complex is dense or mats readily thus obstructing the ease of liquid flow through it, the complex may be admixed with a portion of the same but untreated carrier, or with a non-complex forming inert material such as glass wool or diatomaceous earth. This modification is merely to dilute the active complex, specially separate the active particles from each other, and reduce the resistance to flow.

It is to be noted that the packing of the column may be varied. A dry enzyme-carrier complex may be positioned by a mechanical tapping or jarring or even by an upward current of air or fluid. One objection to such methods is that the entrapped air is not always readily released and in some cases is undesirable. An alternative is to wet the complex with a liquid such as the substrate or water and add the catalyst complex to the column in paste form or in suspension in a liquid. One advantage of these alternatives is that occluded or even adsorbed gases may be expelled.

In those cases where maintenance of the pH within narrow limits is of extreme importance a layer of a suitable ion-exchange resin may precede the catalytic layer or such ion-exchange media may be intimately admixed into the carrier-protective layer or into the enzyme-carrier complex itself.

When water is passed slowly through such a column, no enzyme activity is noted in the effluent. This test is only introduced as experimental confirmation of the stability of the enzyme complex. It may or may not be included in the operational procedure without draining before introducing the substrate.

The substrate is passed through the column in the same manner, it may be introduced at the bottom and allowed to slowly percolate upward through the column packing and out at the top. The substrate may be, for example, a partially hydrolyzed corn syrup obtained by preliminary acid or enzymatic conversion and adjusted to a 50% solids content and a pH of 6.0. The temperature of the column is maintained at 30° C. The reservoir of substrate may be heated to sterilize the contents or it may be maintained at a temperature above that which permits growth of microorganisms. Any suitable antiseptic such as $SO_2$ or formaldehyde may also be added to the substrate if needed to prevent bacterial or fungal infection.

The rate of flow of the substrate through the column is adjusted so that the contact time is sufficient to accomplish the desired reaction. In the case of hydrolyzing a corn syrup substrate to dextrose, the degree of saccharification can readily be measured by polarimetric determinations of the effluent. The degree of hydrolysis may be increased by a reduction in the flow rate or the reaction may be stopped at any intermediate level by increasing the flow rate. This permits of a flexibility of reaction control applicable to any column packed with an enzyme adsorbed upon a carrier.

Tests upon the effluent at the time it leaves the column and the same sample tested 24 hours later will show the same assay, thus indicating the absence of any enzyme eluted from the carrier. Columns packed with a fungal enzyme adsorbed upon a carbon carrier may be operated continuously for one year at about the same efficient rate of flow. This indicates practically no loss in enzyme concentration and essentially no loss in enzymatic activity over unprecedented long periods of time.

The following examples are illustrative of the principles of the invention:

EXAMPLE I

*Crude fungal amylase-activated carbon complex*

48 grams of a crude fungal amylase preparation (Alcozyme) having a starch-glucogenase activity of $k=0.3$ is mixed dry with 24 grams of activated carbon (Darco G-60) and 40 grams of an inert diluent (Filtercel). Water is added to this mixture to form a thick paste. A glass tube approximately 30 mm. in diameter and roughly 2 feet long is closed at each end with a rubber stopper. The bottom stopper is pierced with a single glass tube and the top stopper has two tubes coming from it. Immediately over the bottom stopper is placed a layer of cotton. The thick paste of enzyme-adsorbent complex is placed in the tube over the cotton. A second layer of cotton is placed over this enzyme-adsorbent stratum and the space between the cotton and the upper stopper is filled with glass beads to take up the space and prevent the strata from rising and separating under the pressure of the up-flowing substrate. The top stopper is forced in place and is equipped with two tubes, one tube for removing the effluent, and the other tube, a short upright equipped with a piece of rubber tubing and a screw clamp, which acts as an air release tube. The substrate, which may be corn syrup of approximately 50% solids content, enters at the bottom and percolates slowly through the strata and is removed at the top. In the course of its percolation it comes in contact with the enzyme-adsorbent complex and the corn syrup is hydrolyzed as it passes through the stratum. The extent of hydrolysis is controlled by the rate of flow through this stratum. The slower the flow rate, the greater the extent of hydrolysis. The temperature of the column and the liquid flowing through it for this enzyme is best held between 30° and 40° C. As a general principle the optimum temperature for any enzyme complex in this method would be that range below which any appreciable temperature inactivation takes place. It has been found expedient to introduce a layer of activated carbon below and above the enzyme-adsorbent stratum. In this way, the enzyme-adsorbent stratum is protected from any impurities in the substrate that might tend to inactivate it and also any excess or eluted enzyme would be held by the second activated carbon stratum. The flow rate on a column of this type can be adjusted so that the effluent coming out is practically pure dextrose which can be readily crystallized. At a rate of about 1.5 ml. per hour at 30° C. 50% corn syrup solution (original dextrose equivalent about 40%) is hydrolyzed to a dextrose equivalent of about 85%.

EXAMPLE II

*Purified fungal amylase-activated carbon complex*

A solution of 4 grams of a purified fungal amylase (starch-glucogenase activity $k=6$) is prepared in about 500 ml. of water. 24 grams of activated carbon (Norite) are stirred in and the mixture is kept at about 10° C. for one hour with frequent stirring. 24 grams of an inert diluent are added (Filtercel) and the mixture thoroughly stirred and filtered by suction to form a wet paste. This wet paste is used as the active stratum of a column constructed similarly to that in Example I. In the column, above the bottom layer of cotton, is placed 10 grams of a 1+1 mixture of activated carbon and Filtercel. Above this layer is placed the active enzyme-adsorption complex and then another 10 gram layer of 1+1 activated carbon and Filtercel mixture. A layer of cotton is placed on top of this carbon stratum and then the empty space between the cotton and the rubber stopper is filled with glass beads. The rubber stopper is forced in the tube and wired on. A substrate, consisting of 50% solids corn syrup, is passed through, entering at the bottom, percolating slowly through the various strata, and removed at the top. At a rate of about 1.5 ml. per hour at 30° C., the corn syrup is hydrolyzed to give an effluent having a dextrose equivalent of about 85%.

EXAMPLE III

*Fungal amylase—sierra bleaching clay (Adsorbol) complex*

2 grams of purified fungal amylolytic enzyme (starch glucogenase activity $k=6$) are dissolved in 500 ml. of water and adjusted to pH 5.5. 35 grams of Sierra Bleaching Clay (Adsorbol) are added at 0.5° C. and stirred for about one-half hour. The material is filtered by suction and the wet cake is used as the active stratum of a column. 30% corn syrup solution is passed through this column. On passage through the column, the syrup is converted to dextrose. At a rate of about 1.0 ml. per hour at 40° C. the effluent has a dextrose equivalent of about 80%.

EXAMPLE IV

*Fungal amylase activated carbon complex*

A column of carbon is prepared from a mixture of 10 grams of activated carbon (Darco G-60) and 5 grams of an inert filler (Filtercel). 40 grams of a crude fungal amylase preparation (wheat bran on which has been grown the fungus) having a starch-glucogenase activity of about $k=0.3$ is extracted with 400 ml. of water. After stirring and standing for about one-half hour, the liquor is filtered off. This liquor containing the active amylolytic enzymes is allowed to percolate slowly at the rate of 10 ml. per hour through the carbon column, entering at the bottom and leaving at the top. When all the enzyme solution has passed through, the column is connected with the reservoir containing 50% solids corn syrup. This corn syrup is allowed to run through the column at 30° C. At a rate of about 2 ml. per hour, the corn syrup effluent is hydrolyzed to the extent of about 75% dextrose equivalent.

I claim:

1. A method of making dextrose which comprises contacting an aqueous dispersion of a substance of the group consisting of starches and conversion products thereof with a starch-glucogenase enzyme adsorbed in substantially water-insoluble condition on a substantially water-insoluble adsorbent and thereafter separating the aqueous phase from the adsorbent.

2. A method of making dextrose which comprises contacting an aqueous dispersion of a substance of the group consisting of starches and conversion products thereof with a starch-glucogenase enzyme adsorbed in substantially water-insoluble condition on activated carbon and thereafter separating the aqueous phase from the adsorbent.

3. A method of making dextrose which comprises passing an aqueous dispersion of a substance of the group consisting of starches and conversion products thereof over an enzymatic preparation comprising a starch-glucogenase enzyme adsorbed in substantially water-insoluble condition on a substantially water-insoluble adsorbent.

References Cited in the file of this patent

UNITED STATES PATENTS

| | | |
|---|---|---|
| 1,937,672 | Sherman | Dec. 5, 1933 |
| 2,172,531 | Ekhard | Sept. 12, 1939 |
| 2,360,828 | Craig | Oct. 24, 1944 |
| 2,476,785 | Wallerstein | July 19, 1949 |
| 2,567,000 | Wallerstein | Sept. 4, 1951 |

FOREIGN PATENTS

| | | |
|---|---|---|
| 17,277 | Great Britain | of 1894 |
| 161,870 | Great Britain | Apr. 21, 1921 |
| 543,245 | France | Nov. 7, 1921 |

OTHER REFERENCES

Waksman et al.: Enzymes, William and Wilkins Co., 1926, pages 34–35.

Owen: Sugar, February 1948, pages 36–38.